United States Patent [19]
Portman

[11] Patent Number: 5,811,791
[45] Date of Patent: Sep. 22, 1998

[54] METHOD AND APPARATUS FOR PROVIDING A VEHICLE ENTERTAINMENT CONTROL SYSTEM HAVING AN OVERRIDE CONTROL SWITCH

[75] Inventor: John R. Portman, Anaheim, Calif.

[73] Assignees: Sony Corporation, Tokyo, Japan; Sony Trans Com Inc., Irvine, Calif.

[21] Appl. No.: 824,251

[22] Filed: Mar. 25, 1997

[51] Int. Cl.⁶ .................................................... G01V 9/04
[52] U.S. Cl. ...................... 250/221; 250/227.22; 359/154
[58] Field of Search .................... 250/229, 224, 250/221, 227.22, 227.23, 216; 340/555–557; 359/154, 164, 168

[56] References Cited

U.S. PATENT DOCUMENTS

| | | | |
|---|---|---|---|
| 4,013,342 | 3/1977 | Narodny | 250/227.22 |
| 4,615,680 | 10/1986 | Tomatis | 434/157 |
| 4,641,343 | 2/1987 | Holland et al. | 381/48 |
| 5,487,671 | 1/1996 | Shpiro et al. | 434/185 |

FOREIGN PATENT DOCUMENTS 9100582  1/1991  WIPO .

OTHER PUBLICATIONS

L.R. Rabiner, Levison, S.E. and Sondhi, M.M, "On the Application of Vector Quantization and Hidden Markov Models to Speaker–Indepandent, Isolated Word Recognition", Bell System Tech J, vol. 62(4), Apr. 1983, pp. 1075–1105.

L.R. Rabiner and M.R. Sambur, "an Algorithm for Determing the Endpoints o isolated Utterances", Bell System Tech J. Feb. 1975, vol. 54, No. 2, pp. 297–315.

L.R. Rabiner and J.G. Wilpon, "A simplified, Robust Tranining Procedure for Speaker Trained, Isolated Word Recognition System" J.Acoustical Society of America, Nov. 1980, pp. 1271–1276.

F. Itakura, "Minimum Prediction Residual Principle Applied to Speech Recognition", IEEE Trans. Acoustics, Speech and Signal processing, Feb. 1975, pp. 145–150.

J. Le Roux and C. Gueguen, "A fixed Point Computation of Partial Correlation Coefficient", IEEE ASSP, Jun., 1977, pp. 257–259.

Flanagan, J.L. "Computers that talk and Listen: Manmachine Communication by Voice", Proc IEEE, vol. 64, 976, pp. 405–515, Apr. 1976.

Peacocke, R.D. and Graf, D.H., "An Introduction to Speech and Speaker Recognition", IEEE Computer, vol. 23(8), Aug. 1990, pp. 26–33.

L.R. Rabiner, et al., "Speaker–Independent Recognition of Isolated Words Using Clustering Techniques", IEEE Trans. Acoustics, Speech and Signal Processing, vol. ASSP–27, No. 4, Aug. 1979, pp. 336–350.

*Primary Examiner*—Que Le
*Attorney, Agent, or Firm*—Blakely, Sokoloff, Taylor & Zafman LLP

[57] ABSTRACT

The present invention is a method and apparatus for providing a vehicle entertainment control system that controls a plurality of display units. The vehicle entertainment control system includes a remote override control circuit capable of activating a remote signal for moving at least one of the plurality of display units between a first position and a second position. In addition, the vehicle entertainment control system includes a local display unit movement control circuit coupled to one of the plurality of display units. The local display unit movement control circuit includes a photodiode coupled to said local display unit movement control circuit, the photodiode transmits a light beam capable of being reflected from a reflective surface near the photodiode to make a reflected light beam, and a photodetector coupled to the local display unit movement control circuit, the photodetector providing a signal to the local display unit control circuit upon detection of said reflected light beam to move the one of the display units between the first position and the second position.

20 Claims, 8 Drawing Sheets

METHOD AND APPARATUS FOR PROVIDING A VEHICLE ENTERTAINMENT CONTROL SYSTEM HAVING AN OVERRIDE CONTROL SWITCH

BACKGROUND OF THE INVENTION

1. Field of the Invention

The present invention relates to the field of vehicle entertainment control systems. More particularly, the present invention relates to a vehicle entertainment control system having a remote and/or local override control switch for moving one or more display units between an exposed position and a stowed position.

2. Description of Related Art

Over the last few decades, commercial aircraft have become a necessary mode of transportation for personal and business reasons. In order to improve passenger comfort, many commercial airlines have in-flight entertainment systems which include in-flight television display units for displaying movies and other programming. The display units are typically stowed in a cavity in the ceiling of the passenger cabin located above the passenger seats. During viewing, the display units are placed in an exposed position. Because the display units extend downwards from the cabin ceiling, there is a constant danger that a passenger in transit will hit a display unit, thereby injuring himself and damaging it. Moreover, the Federal Aviation Administration ("FAA") requires that all display units be concealed when the cabin loses power or during an emergency situation. It would therefore be desirable to have a vehicle entertainment control system having a remote and/or local override control switch for moving one or more display units between an exposed position and a stowed position to facilitate the passenger's departure from and return to his seat.

Membrane and electro-mechanical switches are typical switches that can be implemented for moving a vehicle entertainment control system display unit. However, such switches have certain disadvantages associated with them. First, a membrane switch has been proven to be unreliable. In particular, when the membrane switch is cycled too long or too hard, it remains permanently in the closed position. Moreover, the switch is typically marketed as a 0.50 inch square and when installed, is of a marginally acceptable quality from an aesthetic standpoint.

Second, an electro-mechanical switch must be adjusted because it will only operate within a specific mechanical range. In addition, if the switch is not pushed far enough or if it is pushed too far, the switch may be damaged. An electro-mechanical switch also fails to work if the contacts within the switch are subjected to liquid, grease, or some other product that insulates the switch contacts. Although electro-mechanical switches are more reliable than membrane switches, they are still of unacceptable reliability. Both membrane and electro-mechanical switches tend to be expensive. Other types of switches such as inductive and capacitive switches have poor reliability when subjected to radical changes in humidity and temperature.

Therefore, there is a need for a vehicle entertainment control system having a simple, elegant, and highly reliable remote and/or local override control switch for moving one or more display units between an exposed position and a stowed position.

SUMMARY OF THE INVENTION

The present invention is a method and apparatus for providing a vehicle entertainment control system that controls a plurality of display units. The vehicle entertainment control system includes a remote override control circuit capable of activating a remote signal for moving at least one of the plurality of display units between a first position and a second position. In addition, the vehicle entertainment control system includes a local display unit movement control circuit coupled to one of the plurality of display units. The local display unit movement control circuit includes a photodiode coupled to said local display unit movement control circuit, the photodiode transmits a light beam capable of being reflected from a reflective surface near the photodiode to make a reflected light beam, and a photodetector coupled to the local display unit movement control circuit, the photodetector providing a signal to the local display unit control circuit upon detection of said reflected light beam to move the one of the display units between the first position and the second position.

BRIEF DESCRIPTION OF THE DRAWINGS

The objects, features and advantages of the present invention will become apparent from the following detailed description of the present invention in which.

DESCRIPTION OF THE PREFERRED EMBODIMENT

The present invention relates to a vehicle entertainment control system having one or more remote and/or local override control switches for moving one or more display units between an exposed position and a stowed position, the vehicle entertainment system preferably being implemented during in-flight. In the preferred embodiment, the display unit is a liquid crystal display ("LCD") monitor. As discussed herein, a "vehicle" may include, but is not limited to, an aircraft, train, ferry, bus, or any other mode of mass transit. For clarity, the present invention will be described during implementation within a commercial aircraft. Throughout the detailed description, a number of illustrative embodiments are described in order to convey the spirit and scope of the present invention. While numerous specific details are set forth to describe the preferred embodiment of the invention, such details may not be required to practice the present invention.

Figure 1:
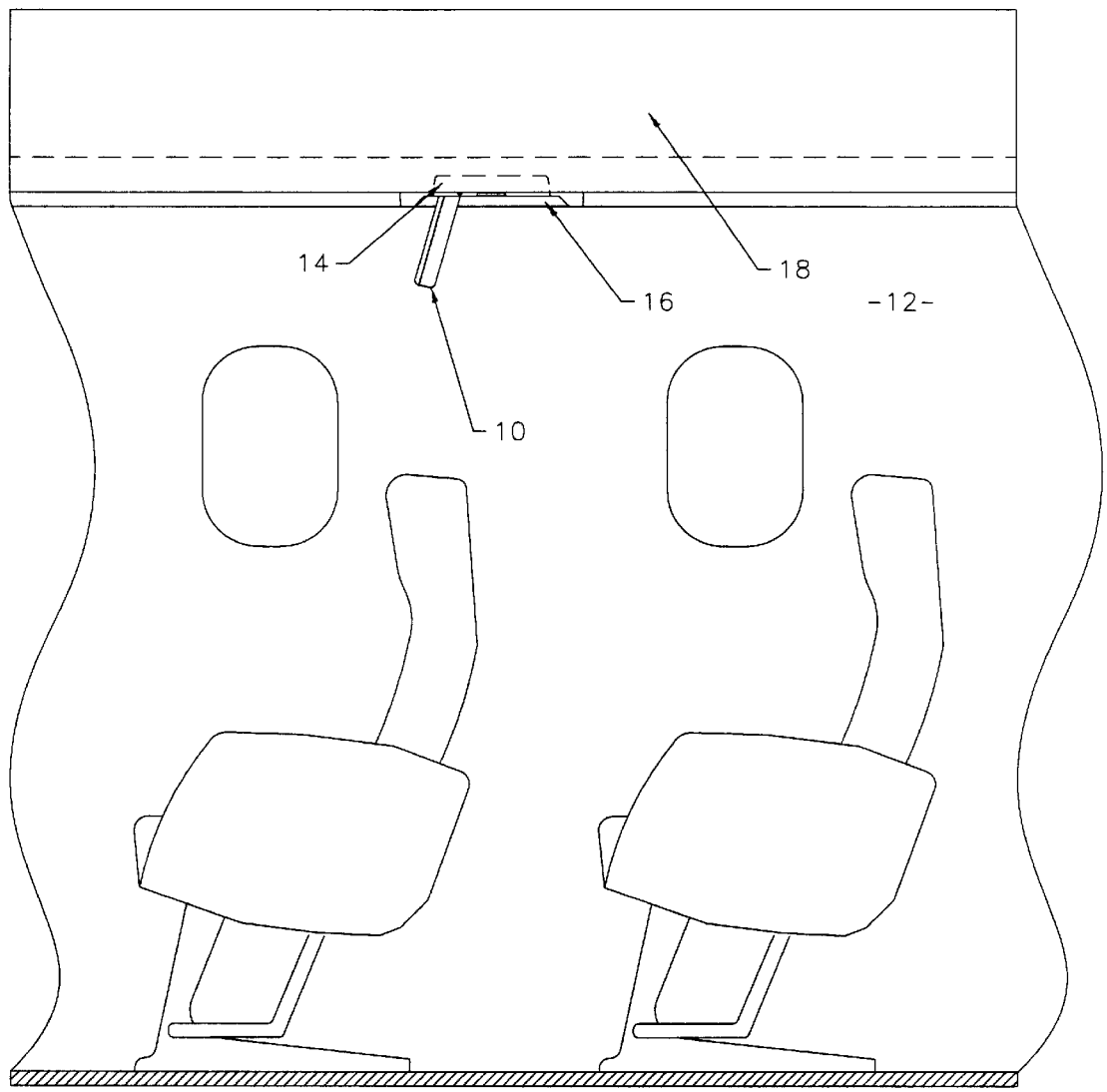
FIG. 1 illustrates a display unit assembled into a passenger cabin of an aircraft.

FIG. 1 illustrates a display unit 10 assembled into a passenger cabin 12 of an aircraft. Referring to FIG. 1, a frame 14 is mounted into a ceiling cavity 16 of a cabin overhead 18 above the passenger seating area for stowing a display unit. Although FIG. 1 shows only one display unit, the passenger cabin includes a plurality of such display units. Normally, the display units 10 are placed in a stowed position, parallel with the frame 14. During viewing of programming such as a movie, the display units 10 are moved into an exposed position. In the embodiment of FIG. 1, the display units are pivotally coupled to the frame 14. However, in a first alternative embodiment, the display units 10 are placed in the cabin overhead 18 perpendicular to the frame 14 when in the stowed position and moved down vertically (either automatically or manually) until they are viewable by passengers. In a second alternative embodiment, the display units 10 are placed outside the ceiling cavity 16 positioned at an angle with respect to the frame 14 when in the stowed position. With respect to the embodiment of FIG. 1, the display units 10 are spaced apart every three rows of seats, so that they are viewable by the passengers.

Figure 2:
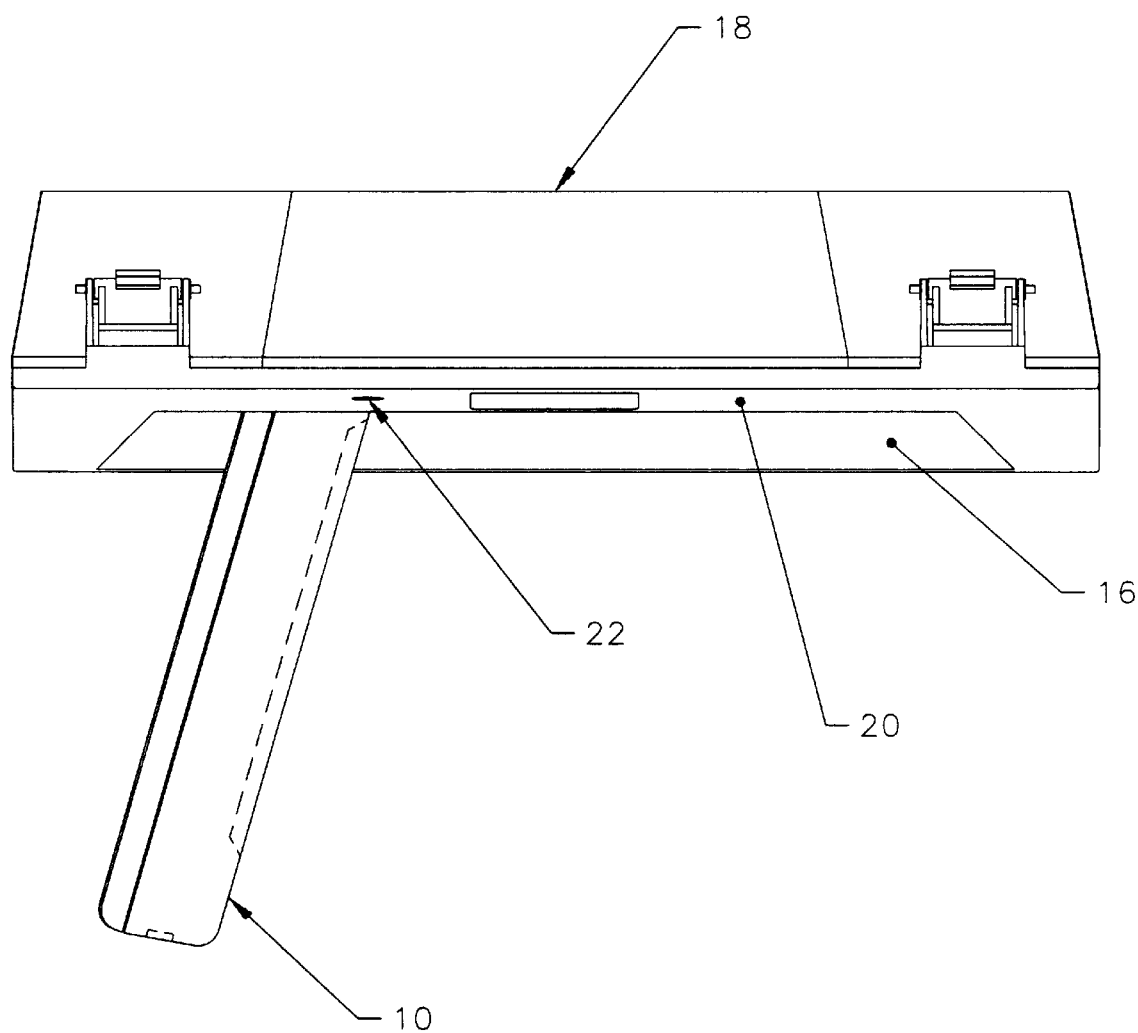
FIG. 2 illustrates a side view of a display unit typically installed in a passenger cabin overhead of an aircraft.

FIG. 2 illustrates a side view of a display unit 10 typically installed in a passenger cabin overhead 18 of an aircraft. Referring to FIG. 2, the display unit 10 is moved between a stowed position and an exposed position. The bottom side of a cabin overhead 18 is a retract surface 20. The retract surface includes an aperture 22 for operating a local override control switch (not shown), which is mounted on the inside of the cabin overhead 18, from the passenger seating area. In an alternative embodiment, a local override control switch may be placed on the back side of the display unit 10 in addition to or in lieu of the local override control switch inside the cabin overhead 18. With two local override control switches, a passenger must place his finger over an aperture located on the back side of the display unit 10 and over the aperture 18 located as shown in FIG. 2 in order to move the display unit 10 between the exposed and stowed positions. This may have the advantage of reducing false actuations.

Figure 3A:
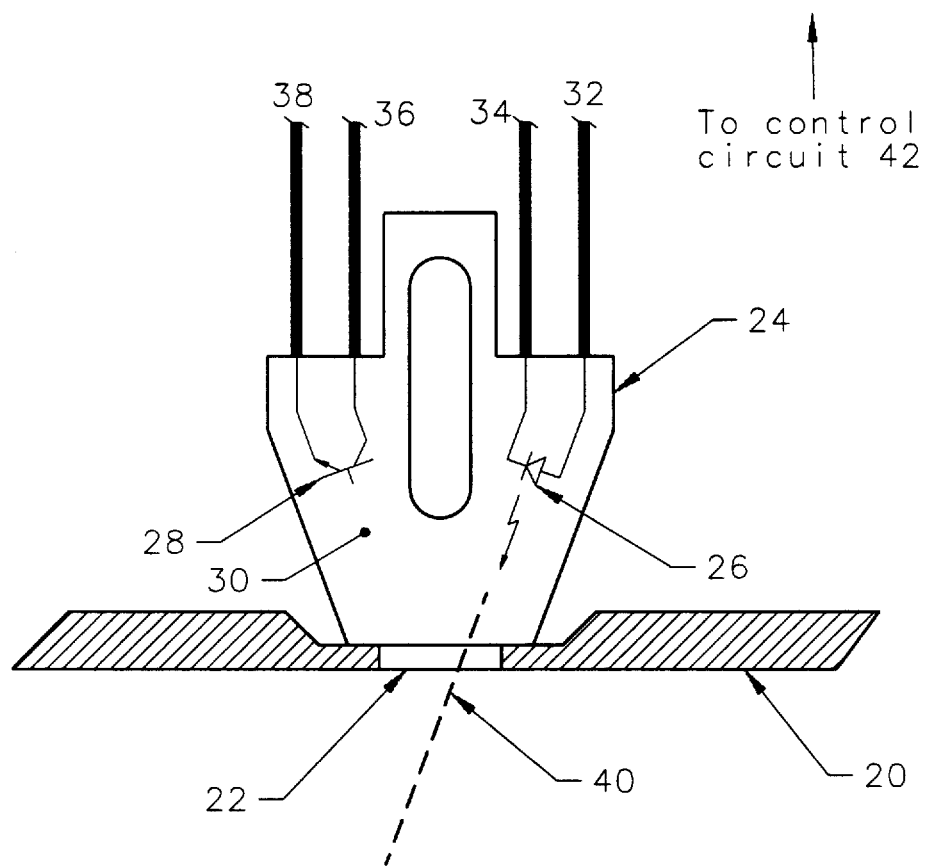
FIG. 3A illustrates a side view of a local override control switch suitable for use with the present invention.

FIG. 3A illustrates a side view of a local override control switch suitable for use with the present invention. In one embodiment, the local override control switch comprises a reflective phototransistor ("RPT") switch 24. Referring to FIG. 3A, the RPT switch 24 includes a photodiode 26 and a phototransistor 28 both enclosed within a housing 30, an anode terminal 32, a cathode terminal 34, a collector terminal 36, and an emitter terminal 38. The phototransistor 28 includes a base, a collector, and an emitter. The RPT switch 24 is mounted on the hidden side of the retract surface 20. The aperture 22 of FIG. 2 is cut out of the retract surface 20 near the display unit. The RPT switch 24 is aligned with the aperture 22 such that the path of a light beam 40, emitted from the photodiode 26, passes through the aperture 22. The RPT switch 24 is coupled to a control circuit (discussed below) via terminals 32, 34, 36, and 38. In one embodiment, the light beam 40 is in the infrared ("IR") frequency range.

Figure 3B:
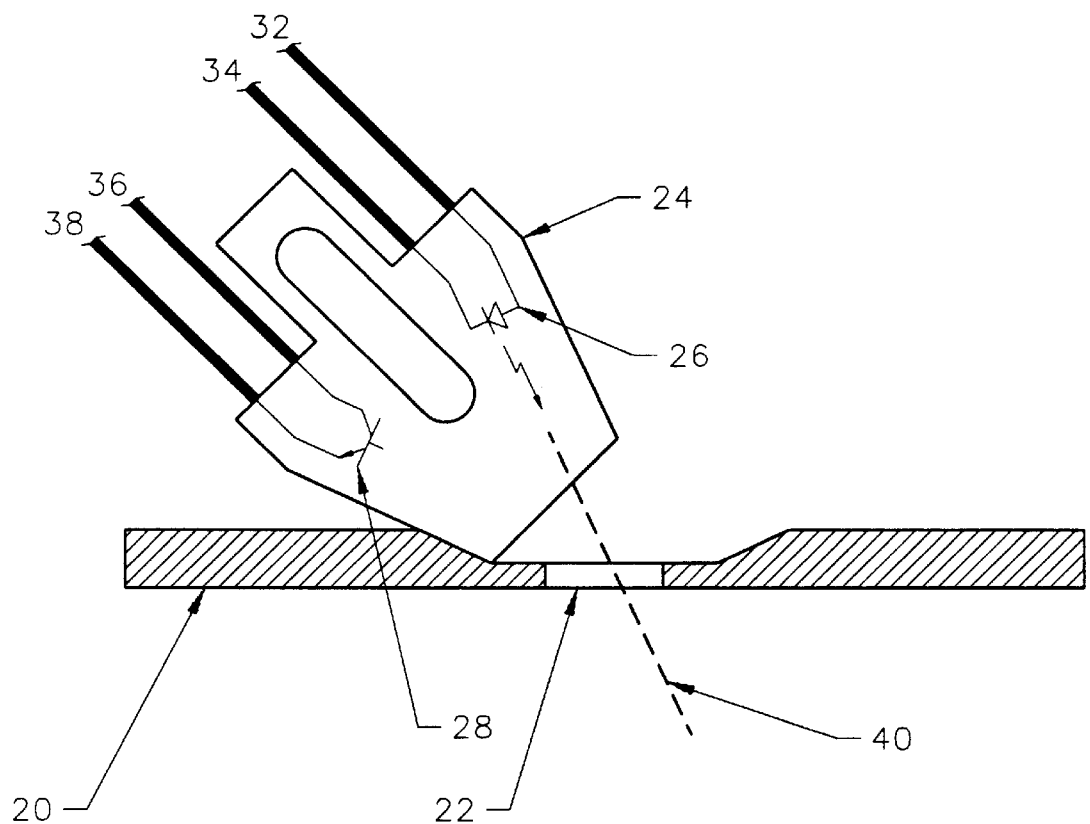
FIG. 3B illustrates a side view of another embodiment of a reflective phototransistor switch suitable for use with the present invention.
Figure 3C:
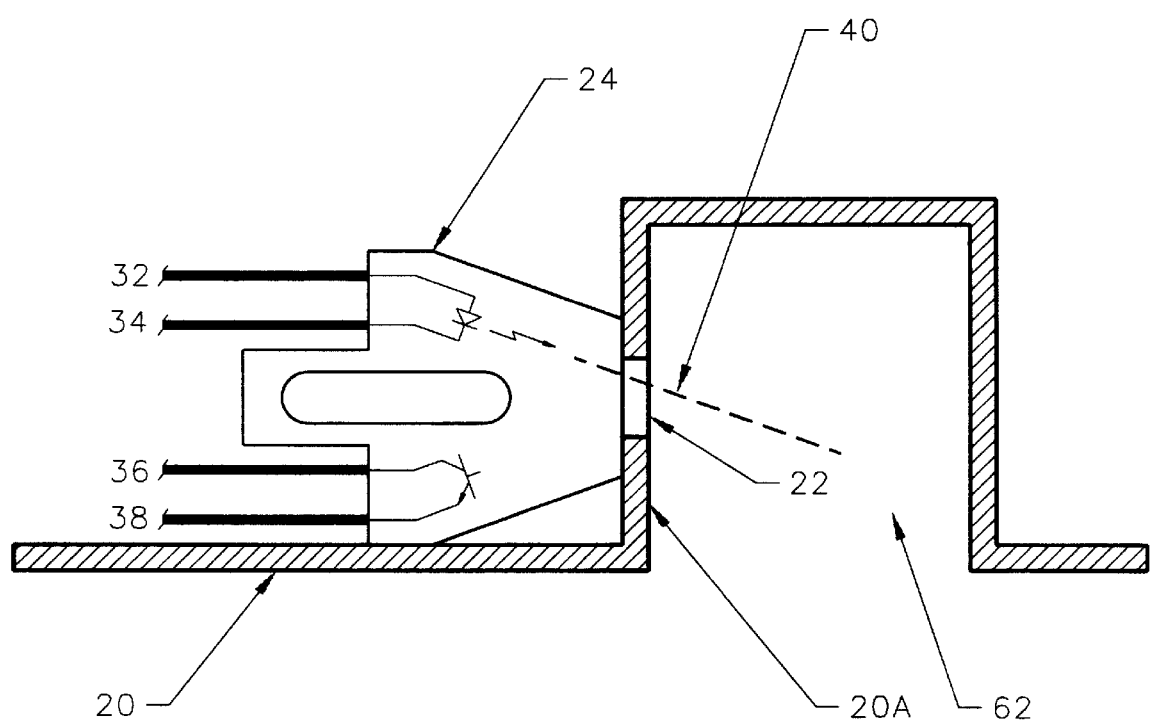
FIG. 3C illustrates a side view of yet a third embodiment of a reflective phototransistor switch suitable for use with the present invention.

FIG. 3B illustrates a side view of another embodiment of a reflective phototransistor switch suitable for use with the present invention. Referring to FIG. 3B, the RPT switch 24 is placed at an angle such that the light beam 40 emitted does not reflect back into the RPT switch 24 and falsely activate it when a person or object is directly below the RPT switch 24. In this embodiment, a person places his finger at an angle over the aperture 22 to activate the RPT switch 24. FIG. 3C illustrates a side view of yet a third embodiment of a reflective phototransistor switch suitable for use with the present invention. In this embodiment, the RPT switch 24 is mounted inside the cabin overhead 18 substantially parallel to the retract surface 20. Adjacent to the RPT switch 24 is a cavity (or recess) 62 having sufficient space to fit a person's finger for activating the RPT switch 24. An aperture 22 is cut out of the retract surface 20A and aligned with the path of the light beam 40. Thus, to activate the RPT switch 24 and move the local display unit, a person's finger (or other type of reflective object) is placed in the cavity 62 to reflect the light beam 40 back into the RPT switch 24.

Figure 4:
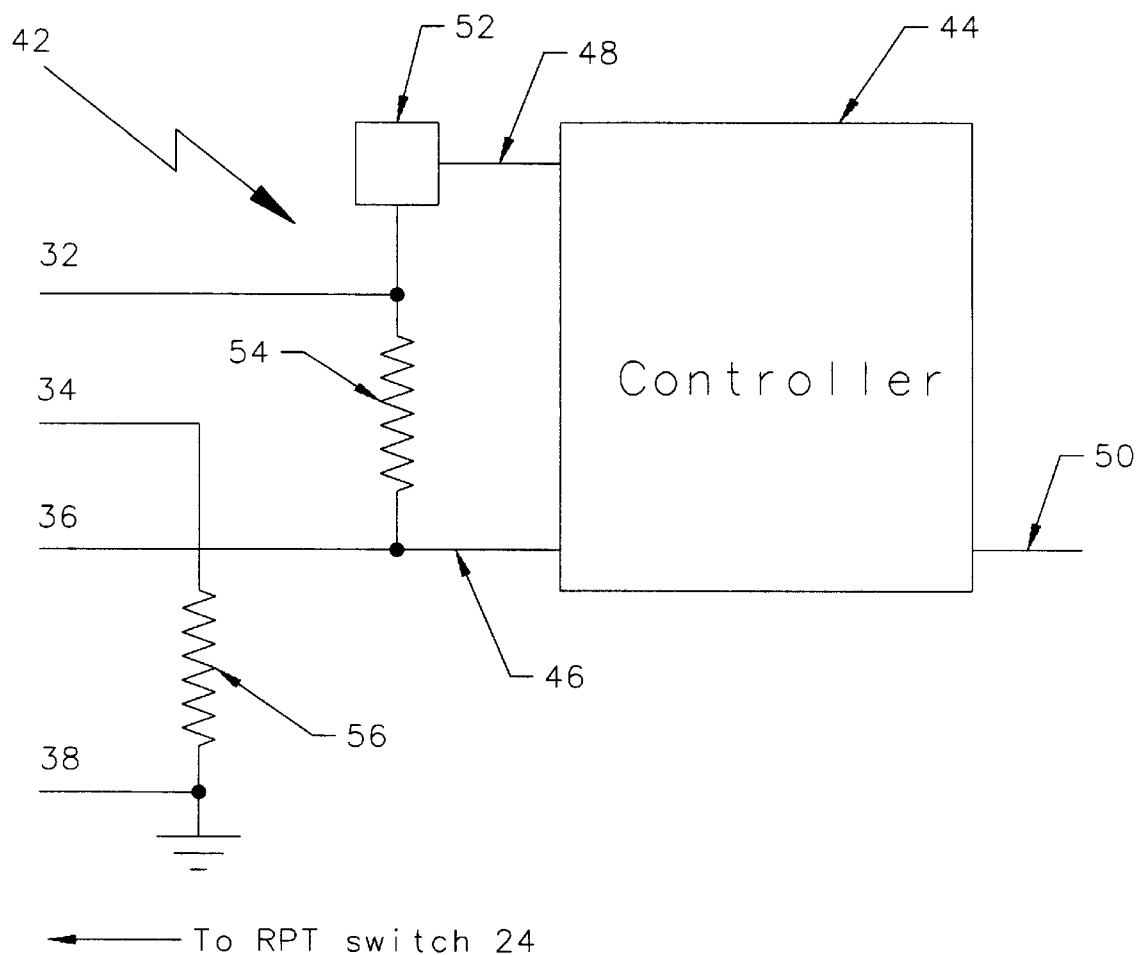
FIG. 4 illustrates one embodiment of the reflective phototransistor switch control circuit suitable for use with the present invention.

FIG. 4 illustrates one embodiment of the reflective phototransistor switch control circuit suitable for use with the present invention. Referring to FIG. 4, the control circuit 42 includes a controller 44 having an input signal line 46, a control signal line 48, and an output signal line 50, a power circuit 52, and resistors 54 and 56. The input signal line 46 to the controller 44 indicates whether the RPT switch 24 is activated, the control signal line 48 controls the power circuit 52 for providing power to the RPT switch 24, and the output signal line 50 controls the movement of the vehicle entertainment control system display unit 10. The output signal line 50 is coupled to an electric motor (not shown) of the display unit 10. When enabled, the output signal line 50 moves the display unit 10 from an exposed position to a stowed position or from a stowed position to an exposed position.

When the vehicle entertainment control system is in the non-operational mode (e.g., during takeoff, landing, etc.), the display unit 10 remains and is maintained in the stowed position. Moreover, during the non-operation mode, the controller 44 disables the control signal line 48. This in turn disables the power circuit 52, so that power to the RPT switch 24 is terminated. When the vehicle entertainment control system is in the operational mode (e.g., during a movie), the display unit 10 is moved to the exposed position for passenger viewing. In addition, during the operational mode, the controller 44 enables the control signal line 48. This in turn enables the power circuit 52 to provide power to the RPT switch 24. The operation of the RPT switch 24 is discussed below.

Continuing to refer to FIG. 4, the anode terminal 32 of the photodiode 26 and the resistor 54 are coupled to the power circuit 52. In the operational mode, the power circuit 52 typically provides 3.3, 5, or 12 volts, thus causing current to flow in the photodiode 26. In response, the photodiode 26 emits a light beam (preferably in the IR frequency range or more preferably about 900 nanometers) that passes through the aperture 22 as shown by the dashed line 40 in FIGS. 3A, 3B, and 3C. The phototransistor 28 is positioned such that its base is aligned with the aperture 22. Normally, the phototransistor 28 is off since its base is not exposed to the light beam. With the phototransistor turned off, the voltage on the input signal line 46 is pulled up "high" by the resistor 54. The controller 44 monitors the "high" state on the input signal line 46 and remains in the status quo state since the RPT switch 24 is not activated.

Figure 5:
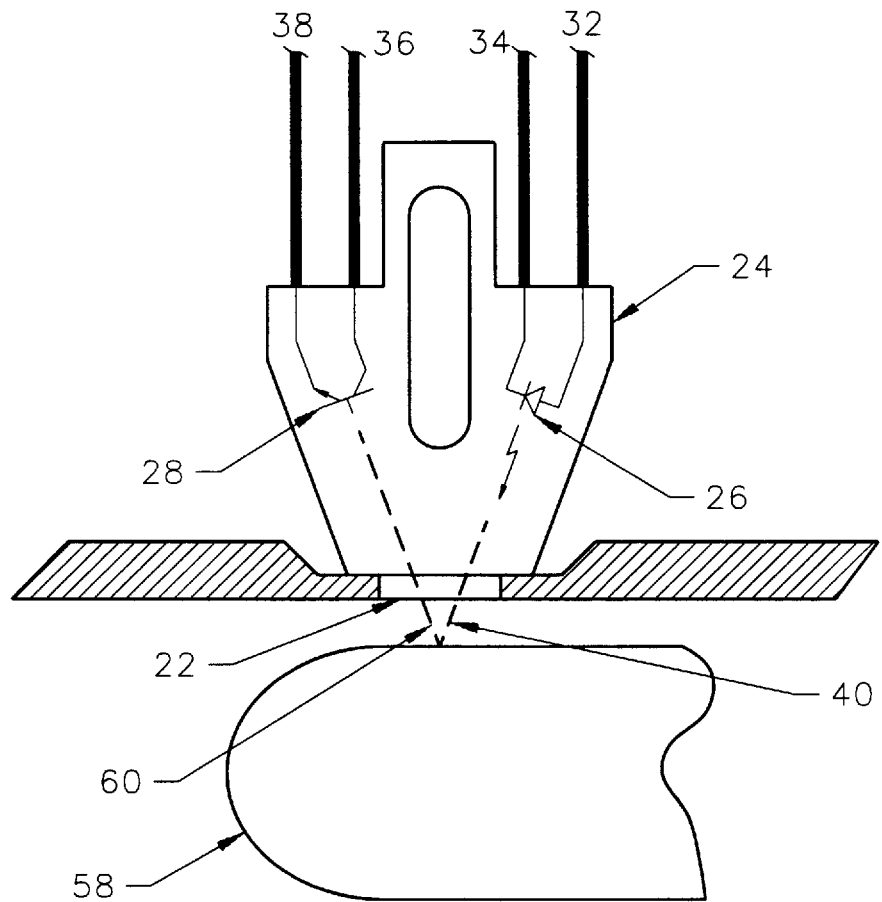
FIG. 5 illustrates the reflective phototransistor switch being activated by a person's finger placed near the aperture.

FIG. 5 illustrates the reflective phototransistor switch being activated by a person's finger 58 placed near the aperture 22. In this embodiment, the person's finger 58 provides the reflective surface for reflecting the light beam 40 back into the RPT switch 24. It must be noted that other reflective surfaces may be used to reflect the light beam emitted from the photodiode 26. Referring to FIG. 5, the photodiode 26 emits a light beam as shown by dashed line 40. A person's finger 58 is placed near the aperture 22 to provide a reflective surface for reflecting the light beam back into the RPT switch 24. The reflected light beam is shown by dashed line 60. The reflected light beam excites the base of the phototransistor 28, thereby causing a base current to flow and turning on the phototransistor 28.

Referring to FIGS. 4 and 5, with the phototransistor 28 turned on, the voltage level on input signal line 46 drops from a logic "high" down to a logic "low" (about 0 volts). The controller 44 monitors and detects the logic "low" on the signal line 46. However, to prevent false actuations while people get in and out of their seats and brush past the RPT switch 24, the controller 44 continuously monitors and detects a logic "low" on the input signal line 46 for a predetermined period of time before asserting a signal on the output signal line 50. In one embodiment, the predetermined period of time ranges between ½–2 seconds, with 1 second being the preferred time period. However, any other time period may be used in lieu thereof.

When the controller 44 continuously monitors and detects the logic "low" on input signal line 46 for the predetermined period of time, it asserts a signal on the output signal line 50. The output signal line 50 is coupled to the electric motor (not shown) of the display unit 10 for moving the display unit between the stowed position and the exposed position. For example, if the display unit 10 is in the exposed position, the asserted signal on the output signal line 50 causes the display unit 10 to move into the stowed position. Alternatively, if the display unit 10 is in the stowed position, the asserted signal on the output signal line 50 causes the display unit 10 to move into the exposed position.

Figure 6:
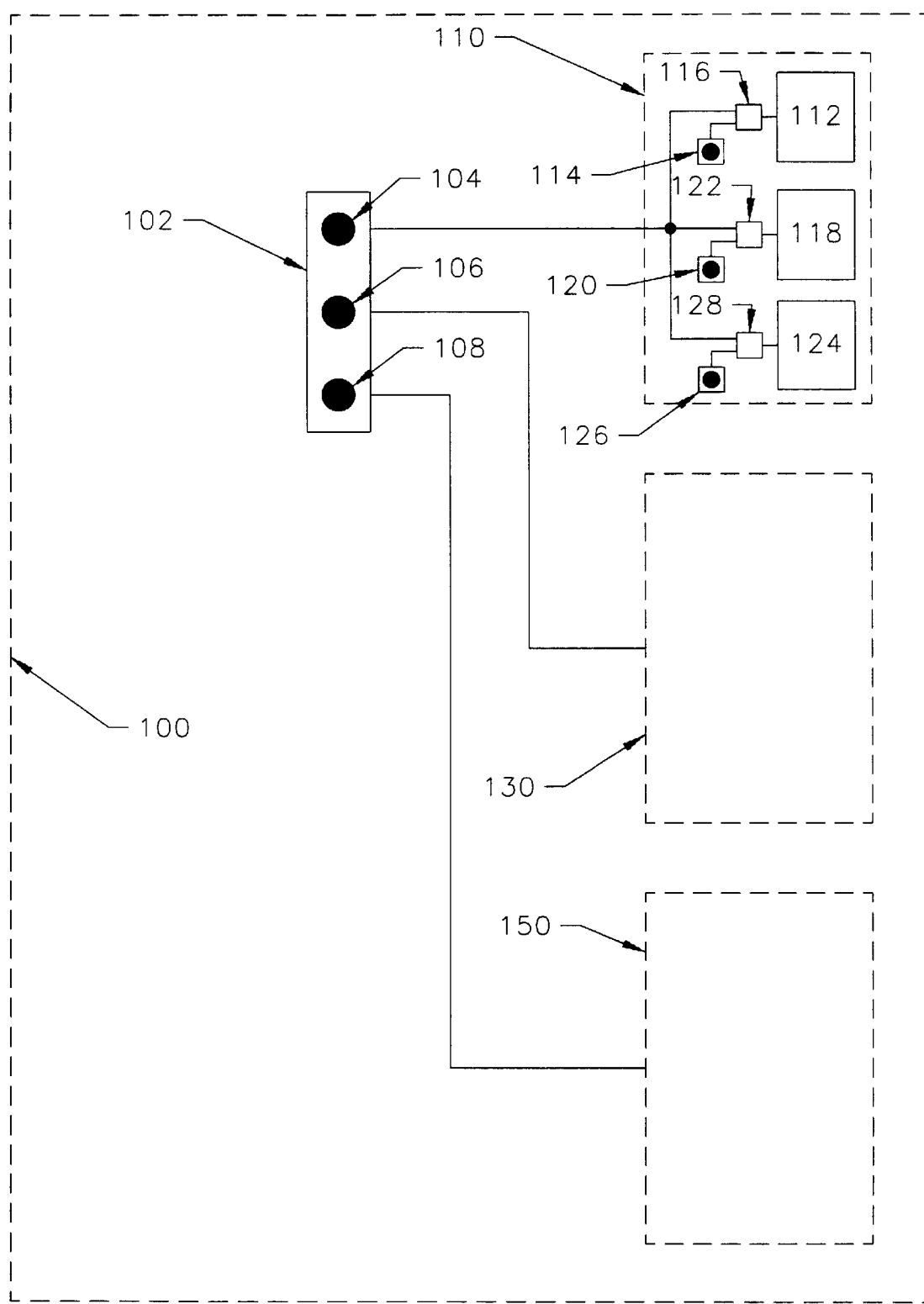
FIGS. 6 illustrates a block diagram of a vehicle entertainment control system having local and remote override control switches for moving a plurality of display units between a stowed position and an exposed position.

FIGS. 6 illustrates a block diagram of a vehicle entertainment control system 100 having local and remote override control switches for moving a plurality of display units between a stowed position and an exposed position. Referring to FIG. 6, the vehicle entertainment control system 100 includes remote override control switch panel 102 having a plurality of remote override control switches 104, 106, and 108 for controlling zones 110, 130, and 150 respectively. Although the vehicle entertainment control system 100 of FIG. 6 has three zones, any number of zones greater than zero may be used. In the embodiment of FIG. 6, the remote override control switch panel 102 is located in the front, back, or any other part of the aircraft for easy access by a flight attendant. In an alternative embodiment, two remote override control switch panels are provided, one in the front of the aircraft for controlling a first set of zones and one in the back of the aircraft for controlling a second set of zones.

Continuing to refer to FIG. 6, the remote override control switch 104 controls the movement of the display units in zone 110. Each zone may have one or more display units. In the embodiment of FIG. 6, zone 110 includes three display units 112, 118, and 124. In addition, each display unit 112, 118, and 124 has a respective local override control switch 114, 120, and 126 and a local control circuit 116, 122, and 128 for providing local override control of the respective display units. In the embodiment of FIG. 6, each of the remote and local override control switches 104, 106, 108, 114, 120, and 126 is the RPT switch 24 of FIGS. 3A, 3B, 3C, and 5.

One application of the present invention will now be disclosed. If a passenger needs help out of his seat (e.g., handicapped person) during viewing of a movie on a display unit, the passenger may push the "help" button for a flight attendant. The flight attendant can, at that point, activate the remote override control switch to move the display units located in the passenger's zone into the stowed position. However, this may be annoying to other passengers because all of the display units within the zone will be stowed. The flight attendant instead can stow only the display unit above the passenger's seat who needs help by activating the local override control switch. In response, the display unit is moved back into the stowed position. The flight attendant can then help the passenger out of his seat. Once the passenger is out of his seat or is situated back into his seat, the flight attendant can move the display unit back into the exposed position by again activating the local override control switch. In response, the display unit is moved back into the exposed position for viewing.

By implementing the present invention, the (local and/or remote) override control switch is a highly reliable switch because it has no mechanical parts. Moreover, the override control switch can be hermetically sealed to prevent dirt buildup within the switch. In one embodiment, the RPT switch 24 is a HOA1405 component, manufactured by Honeywell Corporation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A vehicle entertainment control system having a plurality of display units, comprising:
 a remote override control circuit capable of activating a remote signal for moving at least one of the plurality of display units between a first position and a second position; and
 a local display unit movement control circuit coupled to one of the plurality of display units, including
  a photodiode coupled to said local display unit movement control circuit, said photodiode configured to transmit a light beam capable of being reflected from a reflective surface near said photodiode to make a reflected light beam, and
  a photodetector coupled to said local display unit movement control circuit, said photodetector providing a signal to said local display unit control circuit upon detection of said reflected light beam to move said one of the display units between said first position and said second position.

2. The local override control switch of claim 1 wherein said reflective surface is a person's body part.

3. The local override control switch of claim 1 wherein said reflective surface is a person's finger.

4. The local override control switch of claim 1 wherein said first position is an exposed position.

5. The local override control switch of claim 1 wherein said second position is a stowed position.

6. The local override control switch of claim 1 wherein said light beam is in the IR frequency range.

7. The local override control switch of claim 1 wherein said photodetector is a phototransistor.

8. A method of moving a vehicle entertainment system display unit between a first position and a second position, the method comprising the steps of:
 providing a light beam;
 reflecting said light beam using a reflective surface;
 detecting said reflected light beam;
 providing a signal to a vehicle entertainment system display unit controller; and
 moving the vehicle entertainment system display unit from a first position to a second position.

9. The method of claim 8 wherein said moving step includes the step of moving the vehicle entertainment system display unit from an exposed position to a stowed position.

10. The method of claim 8 wherein said moving step includes the step of rotating the vehicle entertainment system display unit from a stowed position to an exposed position.

11. The method of claim 8 wherein said reflecting step includes the step of reflecting said light beam using a person's body part.

12. The method of claim 8 wherein said reflecting step includes the step of reflecting said light beam using a person's finger.

13. The method of claim 8 wherein said step of providing a light beam includes the step of providing an IR light beam.

14. A local display unit movement control circuit for a vehicle entertainment system for moving a display unit, comprising:

a controller coupled to the display unit;

a photodiode coupled to said controller, said photodiode configured to transmit a light beam capable of being reflected from a reflective surface near said photodiode to make a reflected light beam; and a photodetector coupled to said controller, said photodetector capable of detecting said reflected light beam, and said photodetector providing a signal to said controller for moving the display unit between a first position and a second position in response to detecting said reflected light beam.

15. The circuit of claim 14 wherein said reflective surface is a person's body part.

16. The circuit of claim 14 wherein said reflective surface is a person's finger.

17. The circuit of claim 14 wherein said light beam is in the IR frequency range.

18. The local override control switch of claim 14 wherein said first position is an exposed position and said second position is a stowed position.

19. The local override control switch of claim 14 wherein said first position is a stowed position and said second position is an exposed position.

20. A local display unit movement circuit for retracting a vehicle entertainment system display unit into a cabin overhead of an aircraft, comprising:

a control circuit;

a photodiode coupled to said control circuit, said photodiode configured to transmit an IR light beam, said IR light beam is reflected by a reflective surface to provide a reflected IR light beam; and a photodetector coupled to said control circuit, said photodetector detects said reflected IR light beam, and said photodetector provides a signal to said control circuit for rotating the vehicle entertainment system display unit from an expose position to a stowed position in response to said reflected IR light beam.

\* \* \* \* \*

UNITED STATES PATENT AND TRADEMARK OFFICE
CERTIFICATE OF CORRECTION

PATENT NO. : 5,811,791

DATED : September 22, 1998

INVENTOR(S) : Portman

It is certified that error appears in the above-identified patent and that said Letters Patent is hereby corrected as shown below:

In the title page, item [56], please delete "

References Cited

U.S. PATENT DOCUMENTS

| | | | |
|---|---|---|---|
| 4,013,342 | 3/1977 | Narodny. | 250/277.22 |
| 4,615,680 | 10/1986 | Tomatis. | 434/157 |
| 4,641,343 | 2/1987 | Holland et al. | 38/148 |
| 5,487,671 | 1/1996 | Shipiro et al. | 434/185 |

FOREIGN PATENT DOCUMENTS

| | | |
|---|---|---|
| 9100582 | 1/1991 | WIPO |

OTHER PUBLICATIONS

L.R. Rabiner, Levison, S.E. and Sondhi, M.M, " On the Application of Vector Quantization and Hidden Markov Models to Speaker-Indepandent, Isolated Word Recognition", Bell System Tech J, vol.62(4), Apr. 1983, pp. 1075-1105.

L.R. Rabiner and M.R. Sambur, "an Algorithm for Determining the Endopoints of Isolated Utterances", Bell System Tech J. Feb. 1975, vol. 54, No. 2, pp. 297-315.

L.R. Rabiner and J.G. Wilpon, "A simplified, Robust Tranining Procedure for Speaker Trained, Isolated Word Recognition System" J. Acoustical Society of America, Nov. 1980, pp. 1271-1276.

UNITED STATES PATENT AND TRADEMARK OFFICE
CERTIFICATE OF CORRECTION

PATENT NO. : 5,811,791  Page 2 of 2
DATED : September 22, 1998
INVENTOR(S) : Portman It is certified that error appears in the above-identified patent and that said Letters Patent is hereby corrected as shown below:

F. Itakura, " Minimum Prediction Residual Principle Applied to Speech Recognition", IEEE Trans. Acoustics, Speech and Signal processing, Feb. 1975, pp. 145-150.

J. Le Roux and C. Gueguen, "A fixed Point Computation of Partial Correlation Coefficient ", IEEE ASSP, Jun., 1977, pp. 257-259.

Flanagan, J.L. "Computers that talk and Listen: Manmachine Communication by Voice ", Proc IEEE, vol. 64, 976, pp. 405-515, Apr. 1976.

Peacocke, R.D. and Graf, D.H., " An Introduction to Speech and Speaker Recognition", IEEE Computer, vol.23 (8), Aug. 1990. pp. 26-33.

L.R. Rabiner, et al., "Speaker-Independent Recognition of Isolated Words Using Clustering Techniques ", IEEE Trans. Acoustics, Speech and Signal Processing, vol. ASSP-27, No. 4, Aug. 1979, pp. 336-350. "

Signed and Sealed this

Fourth Day of May, 1999

*Attest:*

Q. TODD DICKINSON

*Attesting Officer*  *Acting Commissioner of Patents and Trademarks*